United States Patent
Candy

[11] 3,731,419
[45] May 8, 1973

[54] HEADER-SPOON WITH FLEXIBLE TRAILING BAIT

[76] Inventor: William R. Candy, R.D. No. 3 Upper Terrace Street, Montpelier, Vt. 05602

[22] Filed: Aug. 27, 1971

[21] Appl. No.: 175,610

[52] U.S. Cl. .............43/42.28, 43/42.41, 43/42.5, 43/44.8
[51] Int. Cl. ..........................................A01k 85/00
[58] Field of Search.....................43/42.28, 42.29, 43/42.4, 42.41, 42.43, 42.5, 44.8

[56] References Cited

UNITED STATES PATENTS

| | | | |
|---|---|---|---|
| 2,812,609 | 11/1957 | Lema | 43/42.28 |
| 1,709,010 | 4/1929 | Foss | 43/42.29 |
| 1,051,978 | 8/1936 | Accetta | 43/42.4 X |
| 3,465,466 | 9/1069 | Showalter | 43/44.8 |

Primary Examiner—Louis G. Mancene
Assistant Examiner—Daniel J. Leach
Attorney—Clarence A. O'Brien et al.

[57] ABSTRACT

An anti-fouling fishing lure for use in any normal aquatic environment characterized, generally stated, by a one piece spoon, a fishhook hingedly linked to the tail portion of the spoon, and a trailing bait having forward and median portions connected to featured portions of the spoon and hook, respectively. The hook embodies a novelly constructed resilient-type weed guard. The trailing bait comprises a suitable bait (usually a plastic worm) of requisite length and cross-section. The self-contained facilities permit the worm to be rigged on the spoon and hook in a manner which assures weight and balance and makes for easy casting without encountering exasperating fouling on the cast, troll or retrieve.

4 Claims, 4 Drawing Figures

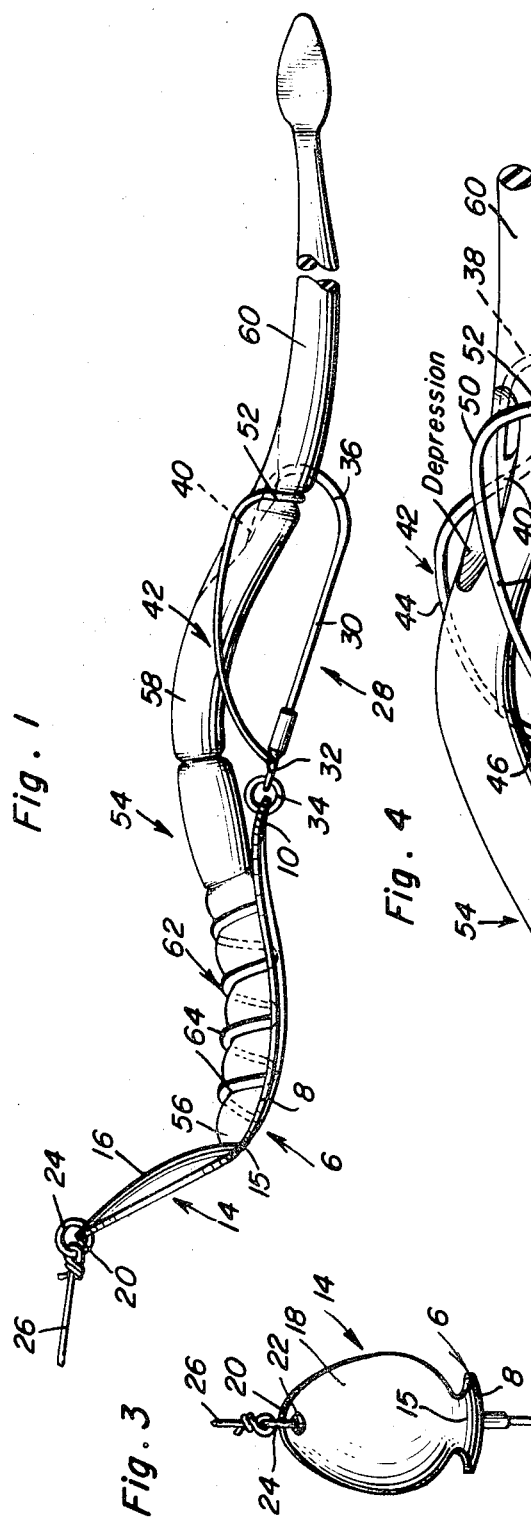
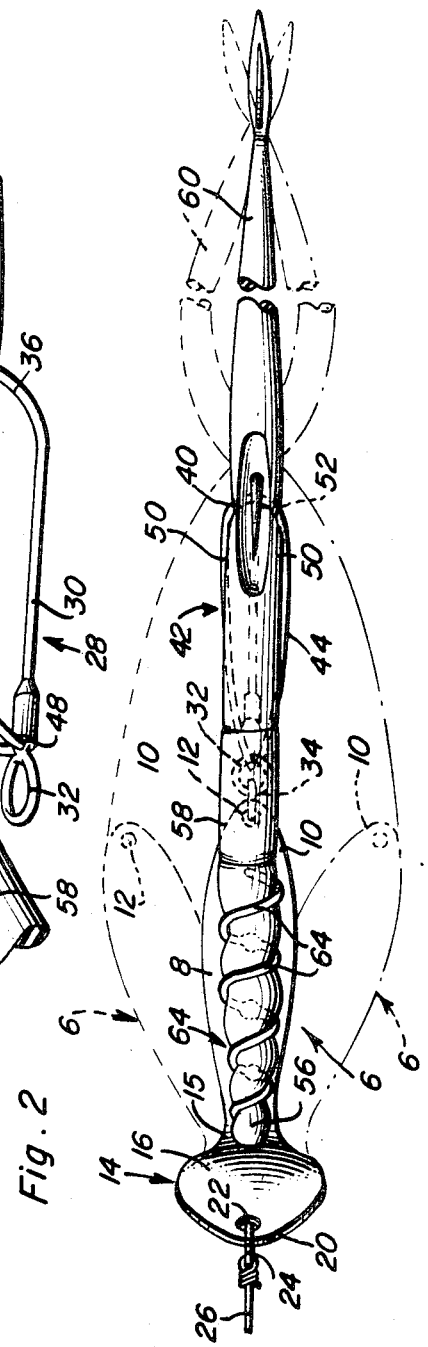
PATENTED MAY 8 1973
3,731,419
William R. Candy
INVENTOR.
BY Clarence A. O'Brien
and Harvey B. Jacobson
Attorneys

HEADER-SPOON WITH FLEXIBLE TRAILING BAIT

This invention relates to certain new and useful improvements in a fishing lure, more particularly an adaptation which comprises an anti-fouling activating header-spoon capable of achieving a side-to-side sweeping and swimming motion, a companion hingedly attached hook equipped with a distinctive type weed guard, and a bait whose leading end and median portions are oriented and coordinated with the header-spoon and weedless hook in an attractive and effective manner.

More specifically, the herein disclosed lure when properly rigged enables the user to control the action of the bait and depth of travel when it is trolled or retrieved, merely by regulating and controlling the speed of the troll or retrieve, with or without skillful rod-tip manipulation. Experienced handling has repeatedly shown that neither the header-spoon nor accompanying bait will foul on the bottom, snag weeds or obstacles when at rest or during a relatively energetic action attending a fast or jerky retrieve by the angler. Then too, the bait is kept in the desired position relative to the spoon, thus assuring dependable and controlable action for satisfying fish attraction and while, at the same time, keeping the hook safely in an anti-fouling state and ever and ready for reliable setting of the hook when the victim fish strikes.

Persons conversant with the art to which the invention relates are aware that many and varied styles and forms of depth controlling spoons, so-called weedless hooks, and elongated artificial bait have been devised and offered for use by anglers. While many prior patents could be cited as having a bearing on the subject matter presented only a few need be set forth here. The fishhook and artificial bait revealed in Showalter's U.S. Pat. No. 3,465,466, may be of interest in that it shows a plastic worm but, more particularly, may be worthy of note for the reason that it shows a fishhook which, among other features, employs a one-piece resilient wire weed guard with a looped rear end portion cooperable with the pointed barbed hook. Further comment on Showalter need not be mentioned here. The artificial fish bait disclosed in Henry C. Toepper's U.S. Pat. No. 1,888,641, can be mentioned, somewhat in passing, for the reason that it reveals a dished spoon having head means, a hook at the trailing end of the spoon, and weed guard means cooperable with both the spoon and hook. A similar adaptation is shown in a patent to Joseph E. Wright, U.S. Pat. No. 1,978,875, which is cited merely because the head-equipped end of the spoon is fashioned into and provides an upstanding wobble plate. It will be evident, having examined these prior patents, that they are cited for general background information only.

Briefly the invention, designated generally as a fishing lure, lends itself to acceptable and efficient use in any normal aquatic environment. It is structurally such that it is virtually anti-fouling and is designed and adapted to enable the user to establish and control the depth of travel and ensures animated action when it is being trolled or retrieved. One component part is set forth as a spoon having an elongated body portion and a tail portion and a leading end provided with and joined to an upwardly forwardly angled head. This head has an upper apical end provided above the center of gravity with line-attaching means. A fishhook is provided for coaction with the tail end of the spoon. The fishhook proper embodies a shank whose forward end is operatively connected to the tail portion. The rearward end, as usual, is provided with a rounding or curvate return-bend. This return-bend terminates in a forwardly directed pointed and barbed bill portion. A flexible trailing type artificial bait, a plastic worm for example, has a forward end supportively and retentively associated with and connected to the leading end of the spoon. A median longitudinally bowed portion of this bait spans the body and tail portions of the spoon and has a part thereof impaled on the barbed bill portion. A free terminal end portion projects rearwardly beyond the return-bend. The forward end portion of the artificial bait is connectible to means carried by and capable of properly positioning, harnessing and holding the head of the bait atop the body portion of the spoon. A novelly constructed and performing weed guard is provided and constitutes a component part of the aforementioned fishhook and features a bait saddling and cradling member which will be set forth with greater particularity in the following detailed description.

It will also be hereinafter evident that the overall fishing lure employs as one of its features a soft plastic or rubber worm, of a type which is now on the open market. This type of flexible trailing bait lends itself to practical and satisfactory use in conjunction with a novelly constructed header-spoon, a single type hook equipped with a structurally unique weed guard, and a ring-type linking connection between an eye at the forward end of the hook and the apertured tail portion of the aforementioned spoon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation showing the fishing lure characterized, more particularly, by the header-spoon at the left, the novel fishhook at the right, the linking means between the hook and spoon, the flexible trailing bait and how it is preferably and advantageously mounted for serviceable use on the spoon and hook, respectively.

FIG. 2 is a top plan view of the lure illustrated in FIG. 1 and which shows, in phantom lines, the manner in which the component parts function when the lure is being used.

FIG. 3 is a front elevational view, that is a view observing FIG. 1, for example, in a direction from left to right.

And FIG. 4 is an enlarged view detailing the specially constructed fishhook and showing with particularity how the bait or worm is impaled, how a portion thereof is held captive between the legs of the weed guard, how the weed guard best serves its intended purpose and how the barbed bill portion of the hook is exposed in association with the depressed top side of the bait.

With reference in particular to FIGS. 1 and 2, it will be observed that the aforementioned spoon, also referred to generally as a header-spoon, is denoted by the numeral 6. It is of one-piece construction and is made from appropriate non-corrodible material. The elongated body portion is denoted at 8 and may, if desired, be slightly dished. The aforementioned rearward tail portion is denoted at 10 and is centrally provided with a hole 12 which is shown in phantom lines in FIG. 2. This part constitutes the spoon proper and is of the approximate ellipsoidal contour illustrated in FIG. 2. The forward or leading end is provided with a complemental forwardly and upwardly angled head 14 which is of the general ovate shape shown in FIG. 3. This head is of concave-convex form, the convex rear side being denoted at 16 (FIG. 1) and the concave side being denoted at 18. The central part of the upper or apical end 20 is provided with a hole 22 to accommodate a ring 24 to which an adjacent end portion 26 of the fishing line is connected. The point of attachment is thus positioned well above the center of gravity of the spoon, a condition which creates a side-to-side arc sweeping motion of the spoon particularly by reason of the water resistance against the head or wobble plate 14. This construction of the spoon is such that it can sink freely after casting or when it is trolled or otherwise pulled through the water which is being fished. Experience has shown that the sweeping arc of the header-spoon in action is noticeably progressive the faster the lure is pulled with the fulcrum of the arc being at the point of attachment to the line. However, under normal trolling speeds and reel-retrieving action, the weight of the header-spoon and its lower center of gravity controls the wobbling side-to-side motion without allowing full rotation about the longitudinal axis of the spoon from its point of attachment to the line.

The aforementioned fishhook is denoted by the numeral 28 and, as best shown in FIG. 4, comprises a generally straight rigid shank 30 provided at its forward end with an eye 32. This eye is hingedly linked to the apertured end of the tail portion, that is the portion 10, by way of a linking or coupling ring 34. This is to say, the ring is connected with the eye 32 and also with the apertured end 10 to achieve the flexible coupling or liking effect illustrated in FIG. 1. The rearward or trailing end of the hook is provided, as usual, with a curvate or rounded hook which is referred to here as a return-bend 36. The portion 38 terminates in a pointed barbed bill portion 40 which is seatable in a depression formed therefore, in the manner shown. Of significance in connection with this hook is the specially constructed weed guard 42 which is fashioned from a single length of resilient wire which is bent upon itself between its ends to provide a pair of legs 44. These legs are longitudinally bowed as best shown in FIGS. 1 and 4 and the forward ends 46 converge and are joined integrally to the shank as at 48 rearwardly of the eye 32. The rearward end portions 50 are spread apart a suitable distance and are connected by a substantially semi-circular depending appropriately angled member which is here designated as a semi-circular or U-shaped saddle 52. The rearward end portions of the legs straddle the barbed point 40 and thus position the saddle rearwardly of the barb and forwardly of the return-bend 36 to assume the intended locale as brought out in both FIGS. 1 and 4.

The soft plastic or rubber worm, an adaptation which is now on the open market, is denoted by the numeral 54 and has a headed forward end portion 56, an intermediate or median portion 58 and a trailing free terminal end portion 60, that is a portion which projects rearwardly beyond the return-bend to achieve the freedom of action shown diagrammatically in FIG. 2.

Attention at this time is directed to the means which is carried by and which is capable of properly positioning and harnessing and holding the head portion 56 atop the body portion of the spoon, the means being denoted generally at 62. More specifically this means comprises a suitable length of wire having longitudinally spaced terminal end portions which are anchored atop the body portion and an in-between portion which is fashioned into spiraling coils 64 which are of a size and shape permitting a portion of the worm to be threaded endwise therethrough and retentively embraced by said coil. This mans 62 also functions as a clamp and serves to securely hold and position the head end of the flexible trailing bait behind the raised wobble plate 14 and in fact against the reduced neck portion 15, whereby to protect and prevent the head of the bait from catching in weeds or snags. This means 62 being attached to the top side of the header-spoon becomes an integral part of it.

A significant component of the overall structure is the aforementioned connector link 34 which provides the desired hinge joint and which connects the tail end of the spoon to the hook in such a manner as to ensure a loose action joint while at the same time keeping the point of the hook in a general upright position in relation to the spoon.

While so-called weedless hooks have long utilized a bent or looped wire or saddle-like construction to keep the debris from the point of the bare hook, the innovation disclosed here is a different application of the spring action to force the bait itself up and around the fully exposed point in order to give the needed protection to the active end of the hook. Thus, the lateral down bent loop or saddle 52 does not just barely come under the point with minimal rise to the side wires running forward to give the fend-off protection to the bare point. Instead, the saddle is here considerably wider and is made to cross under the hook further back on the point toward the curve of the hook and the bight portion of the saddle or loop is semi-circular, open toward the top to generally conform to one-half of the cross-section of the seated penetrated bait. The legs on each side of the point running forward to the eye and shank are well arched above the line of the shaft of the point end of the hook so that these arched or bowed legs in conjunction with the saddle form a suitable cradle to hold and position the bait as well as to press it firmly up against the bottom of the point, barb and that portion of the hook extending above the laterally pierced bait on the hook. The relatively soft worm or bait is further held in position by this piercing of the hook through the cross-section of the bait at the point where the bait would pass the curve of the hook at its farthest distance from the spoon when the head end of the spoon is secured by the means 62. Furthermore the hook is made weedless and snag-proof by virtue of the exposed hook point, barb and shaft immediately aft of it being held in a protective depression topside on the bait caused by the pressure of the spring cradle or saddle pushing the relatively soft bait up and around the underside of the narrow rigid point and barb of the hook.

Finger pressure pushes the head end of the bait 54 firmly into the retainer means 62 on the topside of the spoon. The forward end of the bait is thus positioned, protected and held on the spoon which then can give controlled action to the bait. The lure being flexible is activated in a continuous double wave action when viewed from the top, the resistance of the water on the trailing bait being in general opposition to the sweep of the spoon as the lure is moved through the water.

The bait being pierced through vertically by the hook is kept from sliding back during normal fishing action which might otherwise pull the head from the protective housing. Of greater importance is the fact that the piercing action positions the bait firmly in the spring-wire cradle to give the exposed hook point complete weed and snag protection, and being secured at two points and varying water pressures on the trailing part of the bait behind the spoon imparts secondary action to this part of the lure in continual opposition to the spoon action created by the wobble plate. Since the bait (live or artificial) is also flexible beyond the last anchor point the free end of the bait from this point aft acts to achieve a continual double wave action. Varying retrieving speed gives an undulating movement at the same time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in any normal aquatic environment, an anti-fouling fishing lure designed and adapted to enable the user to establish and control the depth of travel and animated action when it is being trolled or retrieved comprising a spoon having an elongated body portion and a tail portion and a leading end provided with and joined to an upwardly and forwardly angled head, said head having an upper apical end provided above the center of gravity with line attaching means a fishhook embodying a shank whose forward end is operatively connected to said tail portion, and whose rearward end is provided with a curvate return-bend terminating in a forwardly directed point and barbed bill portion, a flexible trailing-type bait having a forward end supportively and retentively associated with and connected to the leading end of the spoon, a median longitudinally bowed portion spanning said body and trail portions, having a part impaled on said barbed bill portion, and a free terminal end portion projecting rearwardly beyond said return-bend, and wherein the forward end of the shank of said fishhook is operatively connected to the tail portion of said spoon by a hinging and connecting link, and a weed guard embodying a pair of resilient legs having forward ends converging and fixedly joined to said shank adjacent a forward end thereof, and having rearward ends joined by a laterally directed U-shaped saddle in which a portion of said bait is cradled, the inherent springy action of said legs to yieldingly force said saddle and the cradled portion of the bait toward and in close proximity to the barbed bill portion.

2. The lure defined in and according to claim 1, and wherein the curvate bight portion of said saddle is positioned to cross under the hook between the locale of the pointed barb and the return-bend and thereby permit the barbed point to be seated in a depression provided therefor in the topside of said bait.

3. For use in any normal aquatic environment, an anti-fouling fishing lure designed and adapted to enable the user to establish and control the depth of travel and animated action when it is being trolled or retrieved comprising a spoon having an elongated body portion and a tail portion and a leading end provided with and joined to an upwardly and forwardly angled head, said head having an upper apical end provided above the center of gravity with line attaching means, a fishhook embodying a shank having a forward end provided with an eye and a rearward end provided with a curved return-bend terminating in a forwardly directed pointed and barbed bill portion, a freely movable but rigid link connected to and carried by said eye and hingedly coupled with a central terminal part of said tail portion, a one-piece weed guard embodying a pair of flexible and resilient spaced legs having forward ends converging and fixedly joined to said shank adjacent said eye, said legs being angled upwardly and rearwardly and having rearward end portions straddling and extending rearwardly beyond the barb and terminating short of said return-bend and being joined by a compatible bait lodging and cradling saddle, legs being longitudinally bowed, the predetermined inherent resiliency of said legs serving to suspend and lift said saddle in a manner that it is yieldingly urged to a bait squeezing and clenching position adjacent said barbed bill portion, the upper side of the body portion of said spoon being provided with flexible bait positioning, harnessing and retaining means for a predetermined attachable portion of a suitable bait, and, in combination, a flexible bait comprising an imitation plastic worm having a headed forward portion superimposed upon said body portion and retentively encompassed by said positioning, harnessing and retaining means with its headed end abutting that portion of the spoon at the juncture of the body and head portions of said spoon, the tail portion of said worm being unrestrained and extending beyond the return-bend of said hook, a first part of the median portion being buckled upwardly, wedged and held captive between the legs of said weed guard, a minimal part being lodged and cradled in said saddle, and an adjacent part being pierced by and impaled on the pointed barbed bill portion of said return-bend.

4. The lure defined in and according to claim 3, and wherein said positioning, harnessing and retaining means comprises a length of wire having longitudinally spaced terminal end portions anchored atop said body portion and the in-between portion fashioned into spiralling coils of a size and manner permitting a portion of the worm to be threaded endwise through and retentively embraced by said coils.

* * * * *